Figure 1:
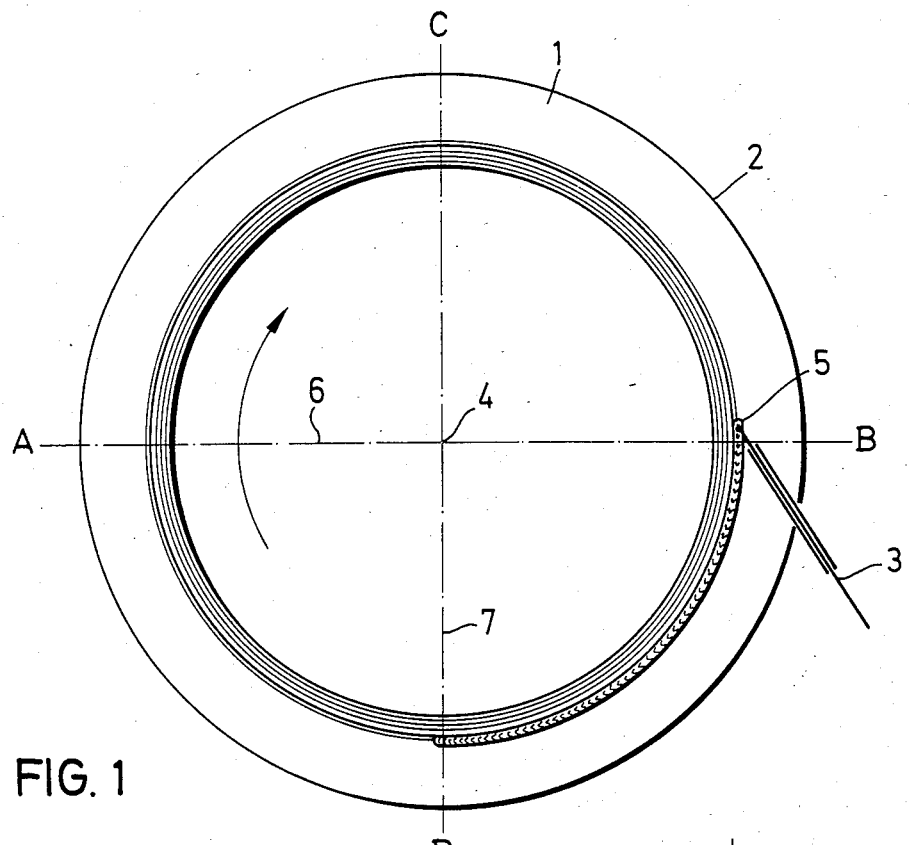

United States Patent [19]

Grosse-Wördemann et al.

[11] Patent Number: 4,604,511
[45] Date of Patent: Aug. 5, 1986

[54] METHOD FOR PRODUCING HEAVY STRUCTURAL ELEMENTS

[75] Inventors: Josef Grosse-Wördemann, Osnabrück; Herbert Luckow, Düsseldorf, both of Fed. Rep. of Germany

[73] Assignee: Thyssen Aktiengesellschaft vorm. August Thyssen-Hütte, Duisburg-Hamborn, Fed. Rep. of Germany

[21] Appl. No.: 609,477

[22] Filed: May 11, 1984

Related U.S. Application Data

[63] Continuation of Ser. No. 314,019, Oct. 22, 1981, abandoned.

[30] Foreign Application Priority Data

Oct. 25, 1980 [DE] Fed. Rep. of Germany ....... 3040296

[51] Int. Cl.[4] .................................................. B23K 9/04
[52] U.S. Cl. ................................ 219/76.14; 219/76.12
[58] Field of Search .................... 219/104, 76.1, 76.12, 219/76.14

[56] References Cited

U.S. PATENT DOCUMENTS 3,995,073 11/1976 Kuonen et al. ................ 219/76.1 X
4,346,280 8/1982 Gulakov et al. .................... 219/76.1

FOREIGN PATENT DOCUMENTS 1527259 6/1969 Fed. Rep. of Germany .
1627549 10/1969 Fed. Rep. of Germany .
2830106 1/1979 Fed. Rep. of Germany .
2743332 3/1979 Fed. Rep. of Germany .

OTHER PUBLICATIONS

American Society for Metals, *Metals Handbook*, vol. 6, Welding and Brazing, 1971, pp. 157–158, 197–199.
Cary, Howard B., *Modern Welding Technology*, 1979, p. 266.
"VGB Kraftwerkstechnik", 58, Heft 7, Jul. 1978, pp. 511–528.

*Primary Examiner*—C. L. Albritton
*Assistant Examiner*—Alfred S. Keve
*Attorney, Agent, or Firm*—Toren, McGeady, Stanger, Goldberg & Kiel

[57] ABSTRACT

A large cylindrical structural element is manufactured by welding together a pair of thick-walled cylindrical components at their ends by applying between the cylindrical components at least one buffer layer of weld material, the buffer layer being applied by a welding electrode held with its axis maintained at an angle to the plane of abutting surfaces of the components with the at least one buffer layer being applied in the form of weld beads which overlap and subsequently applying an assembly weld seam to join the components together.

10 Claims, 7 Drawing Figures

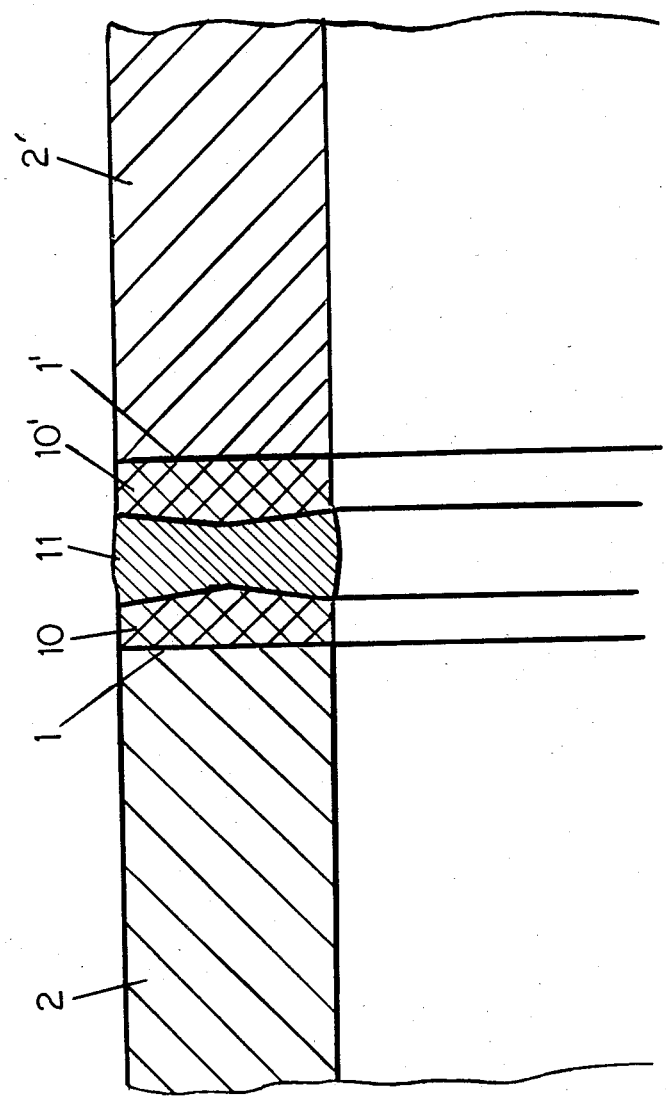

METHOD FOR PRODUCING HEAVY STRUCTURAL ELEMENTS

This application is a continuation of Ser. No. 314,019 filed Oct. 22, 1981 now abandoned.

The invention relates to a method for producing thick-walled, cylindrical, heavy, structural elements in which the components are welded together through at least one buffer-layer and one assembly seam.

The increasing size of heavy structural elements, especially large pressure-containers and heavy shafts, results in forged parts and components of almost unmanageable weight. It is therefore becoming increasingly common for heavy structural elements to be made of individual components which are still manageable and transportable, and to weld these components together in situ. However, on-site welding raises a number of problems. Quite apart from the equipment involved, this procedure must usually be followed by stress-relief annealing and final testing of the finished component. In spite of the usual restriction in operating temperature and linear energy to minimize the danger of embrittlement, annealing is needed, after components are united by welding, because the areas of the base materials of which the components are made, which are adjacent the weld-seam and are known as areas of thermal influence, are subjected during welding to cyclic thermal stressing which, like any other heat-treatment without simultaneous deformation, produces a change in grain-size and thus more or less of a change in the strength and toughness of the materials. Especially in the vicinity of the peak temperature, i.e. in the immediate vicinity of the melting line, this results in the formation of coarse grains associated with a substantial decrease in toughness. Since these are also the areas in which residual stresses are at a maximum, the danger of cracks forming along the sides of the weld-seam is particularly great.

It has been found that the notch between two weld-beads is particularly critical, since the highest residual stresses arise in the vicinity of the root of this notch. This may lead to cracks which easily spread in the direction of the beads under the influence of external stresses.

The aforesaid problems are intensified when materials of different kinds, for instance cast, rolled and forger parts, are welded together. Moreover, stress-relief annealing often causes relaxation cracks in the overheated area of the thermal influence zone.

Attempts to pre-anneal the base-material in order to increase the toughness and thus compensate for the loss of toughness in the thermal-influence zone, have not been successful, since the structure obtained in the thermal-influence zone by this pre-annealing, disappears again upon welding. Attempts to restrict grain-growth in the thermal-influence zone by metallurgical means, with the aid of separation-phases, have also been unsuccessful so far.

Further difficulties are produced, not only during on-site welding, by the frequent necessity of welding together components made of materials of different kinds. This is the case, for example, during the production of multi-layer containers which usually require a multi-layer, cylindrical center-portion of a container to be welded to two cap-like, often forged, end-parts. In this case, the welded joints must be subjected to stress-relief annealing. The result of this is that the multi-layer container loses the prestressing obtained by the production process, one of the main advantages of multi-layer construction.

In order to achieve adequate resistance to failure by embrittlement, even without the otherwise necessary stress-relief annealing, it is known from German OS No. 1 527 259 to apply a buffer-layer to the abutting surface of the said end-part, to subject the said end-part, which is still usually transportable, and the said buffer-layer, to stress-relief annealing, and then to unite the said end-part and the multi-layer container-part by means of an assembly weld-seam. With this method, the weld-material in both the buffer-layer and the assembly-seam must be particularly resistant to cracking and failure by embrittlement. Thus if normal weld-material is used both for the buffer-layer and the assembly-seam, the danger of crack-formation will not be eliminated.

Now it is the purpose of the invention to provide a method which provides a particularly uniform transition area between the base-material and the assembly-seam, thus ensuring a high degree of resistance to brittle-failure without any danger of crack-formation. The achievement of this purpose is based upon the concept of imparting a satisfactory structure not only to the thermal-influence areas, but also to the weld-material of the buffer-layer, by the choice of welding conditions, more particularly by specifically directed solidification, thus achieving increased toughness with a minimum of coarse grains and little residual stress.

In the case of a method of the type mentioned at the beginning hereof, this purpose is achieved, according to the invention, in that, during the welding of the buffer-layer, the axis of the welding electrode runs at an angle to the plane of the abutting surfaces of the components, and the sides of the melted-down weld-beads of the buffer-layer overlap. This alters the course of the solidification front and produces a different alignment of crystals or grains, as compared with conventional welding in which the axis of the electrode is usually approximately at right angles to the plane of the abutting surfaces. The axis of the electrode preferably runs at an angle to two reference-planes at right angles to each other passing through the component axis, one of the said reference-planes passing through the weld-point. Thus the tracking-angle in relation to the reference-plane passing through the weld-point may be between 15° and 35°, while the other track-angle may be between 15° and 50°.

The inclined position, according to the invention, of the electrode also produces less mixing of the weld-material with the alloying constituents of the base-material, thus contributing to making the transition areas more uniform. In addition to this, the inclined position of the electrode results in considerable annealing precisely of the critical zone of the thermal-influence area, during application of the second and subsequent weld-seams. This brings about a decrease in tension and refinement of the grain-size, thus increasing the resistance to failure by embrittlement.

The advantages obtained by the double angular setting of the welding electrode area are apparent even in the welding of assembly-welded components in which the structure of the base-material is inevitably different from that of the weld-material. In this connection, tests have shown that when two components are united by assembly-welding there is no reduction in quality in the vicinity of the joint.

Grain-direction may be shifted to a greater or lesser degree from the vertical towards the plane of the joint, depending upon the magnitude of the two tracking angles and angles of incidence within the limits according to the invention.

The use of an appropriate angle of incidence, and reduced forward feed of the electrode in the direction of the wall-thickness, produces increased overlapping of individual weld-beads, thus largely eliminating the formation of a notch, i.e. the transition, in the molten zone, between the base-material and the weld-material is levelled to a greater or lesser degree.

In order to achieve minimal notch depth and corresponding levelling of the molten zone, the overlap at the sides of the weld-beads is preferably between 50 and 70% of the width of the bead. Furthermore, the welding-current intensity should be between 200 and 700 A, the welding voltage between 30 and 34 V, and the linear energy between 12 and 35 kJ/cm, depending upon the diameter of the welding wire.

Additional advantages as regards the prevention of cracks are obtained by preheating individual components to between 100° and 250° C. and/or by stress-relieving after the application of the buffer-layer, the vicinity of the thermal-influence zone, at between 500° and 650° C.

In the case of heat-treated material, it is also possible to apply the buffer-layers before the component is heat-treated. In this case, the transition-zone in the base-material is simultaneously heat-treated. This eliminates any difference in quality in this area, as compared with untreated base-materials.

It is also possible, with the method according to the invention, to keep the height of the buffer-zone greater than the depth of the thermal-influence zone during assembly-welding, in order to leave the base-material substantially unaffected by the heat of the assembly-welding and to restrict the thermal-influence zone of the assembly-weld entirely to the buffer-layers.

Finally, starting with a material still compatible with the base-material, the composition of the weld-material may alter, as the distance from the joint increases, more and more towards incompatibility, providing a flowing transition and thus making it possible to use, for the assembly-weld, a weld-material which is more resistant to brittle-failure and is incompatible per se with the base-material.

The applied buffer-layers, and the transition-zone to the base-material, may easily be checked for defects prior to assembly welding. In fact this increases the ability to detect defects in the heat-influenced transition zone to the base-material. Defects in this area may then be eliminated.

Figure 2:
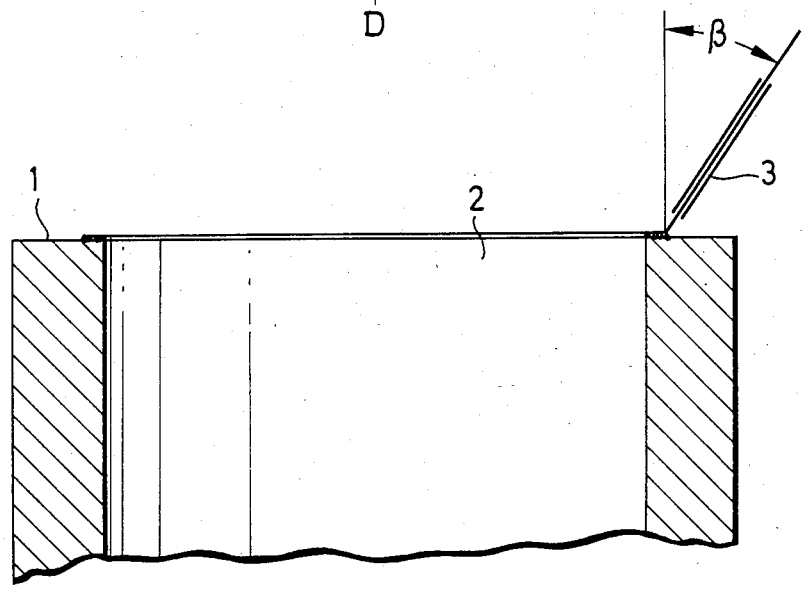
Figure 3:
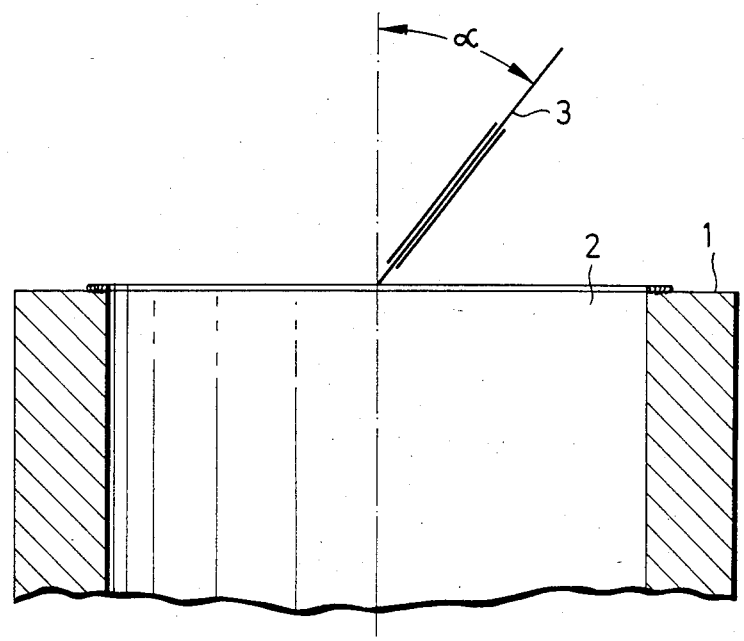
Figure 4:
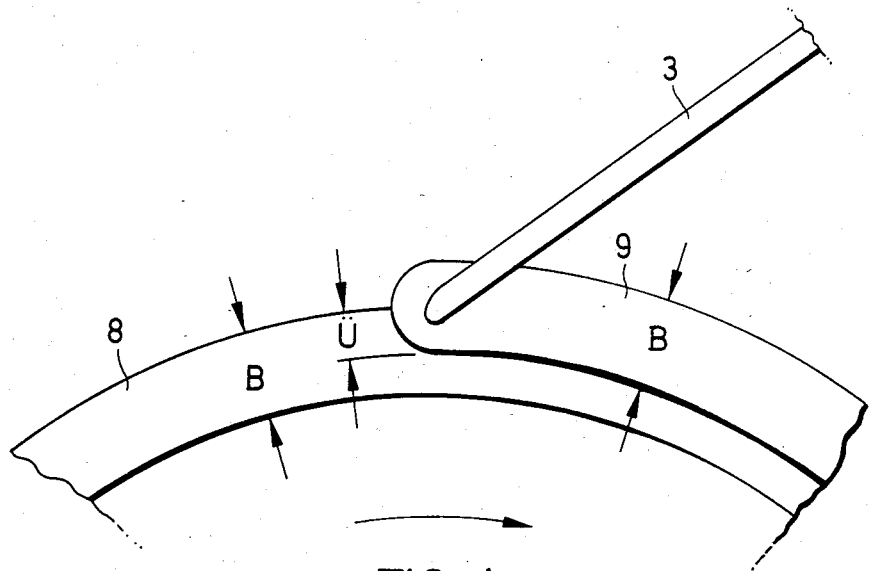
Figure 5:
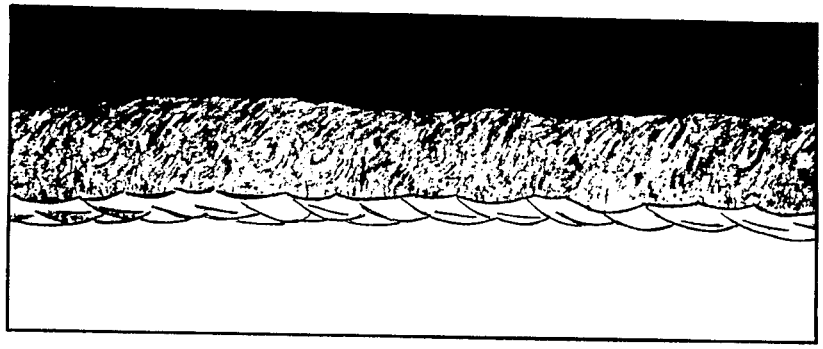
Figure 6:
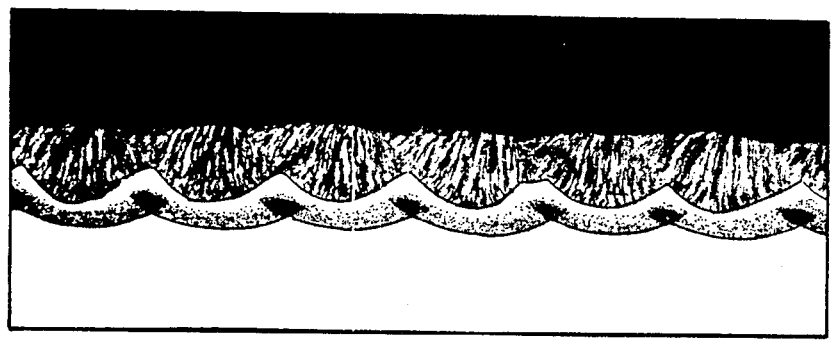

The invention is explained hereinafter in greater detail in conjunction with the examples of embodiment illustrated in the drawing attached hereto, wherein:

FIG. 1 is a plan view of the abutting surface of a structural component;
FIG. 2 is a section along the line A–B in FIG. 1;
FIG. 3 is a section along the line C–D in FIG. 1;
FIG. 4 is an enlarged representation of a part of the abutting surface, with two weld-beads;
FIG. 5 shows a weld-seam produced according to the invention and consisting of a plurality of beads;
FIG. 6 is a micro-section of a comparable weld-seam made in the conventional manner; and
FIG. 7 is a cross-sectioned view of the welding area.

When a buffer-layer is applied to abutting surface 1 of a structural element 2, the axis of welding electrode 3 is at an angle to a reference-plane 6 passing through axis 4 of the element and weld-point 5, and is also at an angle to a reference-plane 7 which is at right angles to reference-plane 6 and also passes through axis 4 of the element. This produces a tracking angle relating to reference-panel 6 in the projection onto reference-plane 7 and a tracking angle relating to reference-plane 7 in the projection onto the plane of the abutting surface.

FIG. 4 shows clearly how weld-beads 8 and 9 overlap, the ratio between the degree of overlap U and the width of the weld-bead B being 0.57. An overlap of this kind ensures largely notch-free weld-material, as shown by the photograph in FIG. 5 as compared to that in FIG. 6. Also shown clearly in FIG. 5, in contrast to FIG. 6, is the uniformity of the transition-zone between the weld-material on the one hand and the base-material on the other hand, especially the slightly undulating front line. In FIG. 7 there is shown a pair of components 2 and 2' which are joined together by an assembly seam 11. Each of the components 2 and 2' has applied to surfaces 1 and 1' thereof, respectively, buffer layers 10 and 10'.

EXAMPLE 1

During one test, two forged container-sections made of the same material are to be welded together on site. The said sections are made of steel having the following composition:

0.26% Carbon
0.15% Silicon
0.30% Manganese
0.009% Sulphur
0.008% Phosphorus
1.70% Chromium
3.50% Nickel The container-sections are preheated in the shops to 200° C.+20° C. and the buffer-layers are then applied, using 4.0 mm welding electrodes of the following qualities;

1st layer: S 3 Ni Mo 1
2nd layer: S 3 Ni Mo Cr
3rd and further layers: S 3 Ni Mo Cr.

This produced the following analysis-pattern:

| Designation | C (%) | Si (%) | Mn (%) | P (%) | S (%) | Al (%) | Cu (%) | Cr (%) | Ni (%) | Mo (%) | As (%) |
|---|---|---|---|---|---|---|---|---|---|---|---|
| Base-Material | 0.24 | 0.19 | 0.32 | 0.008 | 0.007 | 0.003 | 0.07 | 1.77 | 3.03 | 0.45 | 0.023 |
| First Buffered-layer | 0.15 | 0.21 | 0.79 | 0.012 | 0.008 | 0.011 | 0.06 | 0.77 | 2.42 | 0.44 | 0.020 |
| Second Buffered-layer | 0.09 | 0.14 | 0.86 | 0.017 | 0.010 | 0.008 | 0.05 | 0.40 | 1.88 | 0.30 | 0.010 |
| Third and additional Buffered layers | 0.08 | 0.17 | 1.01 | 0.020 | 0.009 | 0.009 | 0.04 | 0.32 | 1.72 | 0.60 | 0.015 |
| Material in Weld Seam | 0.09 | 0.24 | 1.19 | 0.021 | 0.009 | 0.014 | 0.04 | 0.28 | 1.60 | 0.62 | 0.14 |

For the buffer-layers, tracking angle α was 15° and tracking angle β 30°. The weld-bead overlap in the buffer-layers amounted to 55% of the width of the weld-bead.

The buffer-layers were applied with the following welding data.
Welding current intensity: 500 A
Welding Voltage: 32 V
Linear Energy: 19 kJ/cm After the total width of the buffer-layers on each container section had reached 15 mm, the thermal-influence zones between the buffer-layers and the base-material were heat-treated.

After this heat-treatment, the thermal-influence zones were tested as follows in the shops:
1. Ultrasonic testing
2. X-Ray testing
3. Visual examination of micro-section
4. Test by the Parallel micro-section method
Result: no detectable defects.

The shop-tested container-sections, fitted with buffer-layers, were then transported to the work-site and were welded together. Since the sections of the buffer-layers to be joined consisted of weld-material only, no cracks appeared in joint-seam because of the procedure according to the invention.

EXAMPLE 2

In another test, a forged end and a container-section welded to shape, made of different materials, were to be united by on-site welding. Material 1 had a tendency to form cracks in the thermal-transition zone, while material 2 was unaffected by welding.

The forged end was made of a steel having the following composition.
0.26% Carbon
0.15% Silicon
0.30% Manganese
0.009% Sulphur
0.009% Phorphorus
1.70% Chromium
3.50% Nickel The weld-material used to make the container section had the following composition:
0.10% Carbon
0.15% Silicon
1.22% Manganese
0.007% Sulphur
0.007% Phosphorus
0.05% Chromium
1.0% Nickel The end, made of steel having a tendency to form cracks in the thermal-transition zone, was preheated in the shops at 200° C. It was then provided with buffer-layers, the material of the welding electrodes being altered from layer to layer, in order to bring it closer to the steel of the container-section unaffected by welding. To this end, welding electrodes of the following composition were used consecutively:

| | C (%) | Si (%) | Mn (%) | P (%) | S (%) | Mo (%) | Ni (%) | Cr (%) |
|---|---|---|---|---|---|---|---|---|
| First and Second Buffer Layers | 0.20 | 0.15 | 0.40 | 0.008 | 0.008 | 0.60 | 3.50 | 1.60 |
| Third and Fourth Buffer Layers | 0.13 | 0.15 | 1.50 | 0.008 | 0.008 | 0.55 | 1.00 | 0.05 |

In the buffer-layers, tracking angle $\alpha$ was 15° and tracking angle $\beta$ was 30°. The weld-bead overlap in the buffer-layers amounted to 55% of the width of the weld-bead.

The buffer-layers were applied with the following welding data:
Welding Current intensity: 500 A
Welding Voltage: 32 V
Linear Energy: 19 kJ/cm As soon as the width of the buffer-layers on the container-section had reached 20 mm, and the material of the container-section had been reached with the final buffer-layer, the thermal-influence zone between the buffer-layers and the base-material was annealed at 640° C.

The thermal-influence zone was thereafter tested as follows in the shops:
1. Ultrasonic Test
2. X-Ray test
3. Visual Examination of micro-section
4. Test by the Parallel micro-section method
Result: no detectable defects.

The shop-tested end, provided with buffer-layers, and the container-section, were then transported to the work-site and welded together. No cracks appeared in the weld-seam because of procedure according to the invention.

We claim:

1. A method for manufacturing large cylindrical structural elements comprising the steps of:
providing a pair of thick-walled cylindrical components each defining a longitudinal axis and each having a planar abutting surface at one end thereof, said cylindrical components being adapted to be joined together by welding at said planar abutting surfaces;
applying between said cylindrical components on at least one of said planar abutting surfaces at least one buffer layer of weld material, said buffer layer being applied by arc welding with a welding electrode having an axis;
holding said welding electrode with the axis thereof at an oblique angle relative to said planar abutting surface while said buffer layer is applied, said buffer layer being applied in the form of weld beads which overlap at their flanks by 50–70% of their width;
maintaining said axis of said electrode at an angle to two reference planes perpendicular to each other intersecting at said axis of said component, one of said reference planes passing through the weld point at which said at least one buffer layer is applied; and
holding said axis of said electrode at a first tracking angle in relation to the reference plane passing through the weld point, and at a second tracking angle with relation to the other of said reference planes of between 15° and 50°.

2. A method according to claim 1 wherein the welding-current intensity is between 200 and 700 A and the welding voltage is between 30 and 34 V.

3. A method according to claim 1 wherein the linear energy is between 12 and 35 kJ/cm.

4. A method according to claim 1 wherein individual components are preheated to between 100° and 250° C.

5. A method according to claim 1 wherein after the application of the buffer-zones the thermal-influence zones of the components are stress-relieved between 500° and 650° C.

6. A method according to claim 1 wherein the individual components, together with the applied buffer-layers, are heat-treated.

7. A method according to claim 1 wherein the height of the buffer-layers is greater than the depth of the thermal-influence zone during application of said assembly weld seam.

8. The method of claim 1, wherein said first tracking angle in relation to the reference plane passing through the weld point is between 15° and 35°.

9. In a method of manufacturing a large, heavy and thick-walled cylindrical element by welding together at least two structural components, each having an axis and a planar abutting surface to be weld-joined with an assembly seam and a buffer layer of weld material interposed between the planar abutting surfaces, the improvement which comprises:

arc welding the buffer layer to at least one of said planar surfaces with an electrode so that the buffer layer melts down and forms beads whose flanks overlap by 50-70% of the weld bead width, said electrode having an axis which during welding of the buffer layer is maintained in inclined position relative to the planar abutting surface of the component, said electrode also being maintained in inclined position with a tracking angle of 15°-50° in relation to two reference planes extending perpendicular to each other, said reference planes intersecting in the axis of the component, one of said reference planes passing through the weld point.

10. The method of claim 9, wherein the composition of the weld material of the buffer layer is compatible with the composition of the structural component where the buffer layer contacts the abutting surface, said composition of the weld material of the buffer layer changing in the direction toward said assembly seam and with increasing distance from said abutting surface so as to be incompatible with the composition of the structural element, whereby a flowing transition is created and the assembly seam welding may be effected with a weld material which is incompatible with the composition of the structural component and is resistant to brittleness-failure.

* * * * *